United States Patent

[11] 3,604,985

[72] Inventors David B. Peck;
 Walter W. Schroeder, both of Williamstown, Mass.
[21] Appl. No. 7,657
[22] Filed Feb. 2, 1970
[45] Patented Sept. 14, 1971
[73] Assignee Sprague Electric Company,
 North Adams, Mass.
 Continuation-in-part of application Ser. No. 792,648, Jan. 21, 1969, now Patent No. 3,564,343.

[54] COULOMETRIC DEVICE WITH NONCONDUCTIVE INORGANIC ELECTRODE SUBSTRATE
6 Claims, 1 Drawing Fig.

[52] U.S. Cl. ................................. 317/230, 317/231
[51] Int. Cl. ................................. H01g 9/06
[50] Field of Search ......................... 317/230, 231; 324/68, 94

[56] References Cited
UNITED STATES PATENTS

| | | | |
|---|---|---|---|
| 2,791,473 | 5/1957 | Mattox | 340/213 |
| 2,910,647 | 10/1959 | Kreitsek et al. | 324/68 |
| 3,119,754 | 1/1964 | Blumenfeld et al. | 204/52 |
| 3,395,402 | 7/1968 | Widrow et al. | 340/173 |
| 3,423,648 | 1/1969 | Mintz | 317/231 |
| 3,428,894 | 2/1969 | Baettcher | 324/94 |

Primary Examiner—James D. Kallam
Attorneys—Connolly and Hutz, Vincent H. Sweeney, James Paul O'Sullivan and David R. Thornton ABSTRACT: A coulometric cell employs a nonconductive inorganic envelope containing an electrolyte and an expansion bubble. First and second spaced electrode members extend from outside of said envelope, through the wall thereof and into said electrolyte. Each electrode member comprises a nonconductive inorganic substrate having at least the same coefficient of thermal expansion as that of the inorganic envelope. Each substrate carries a thin conductive film which extends from within to outside of said envelope. The envelope is bonded in fluidtight arrangement about the periphery of the electrode members where they pass through the wall thereof.

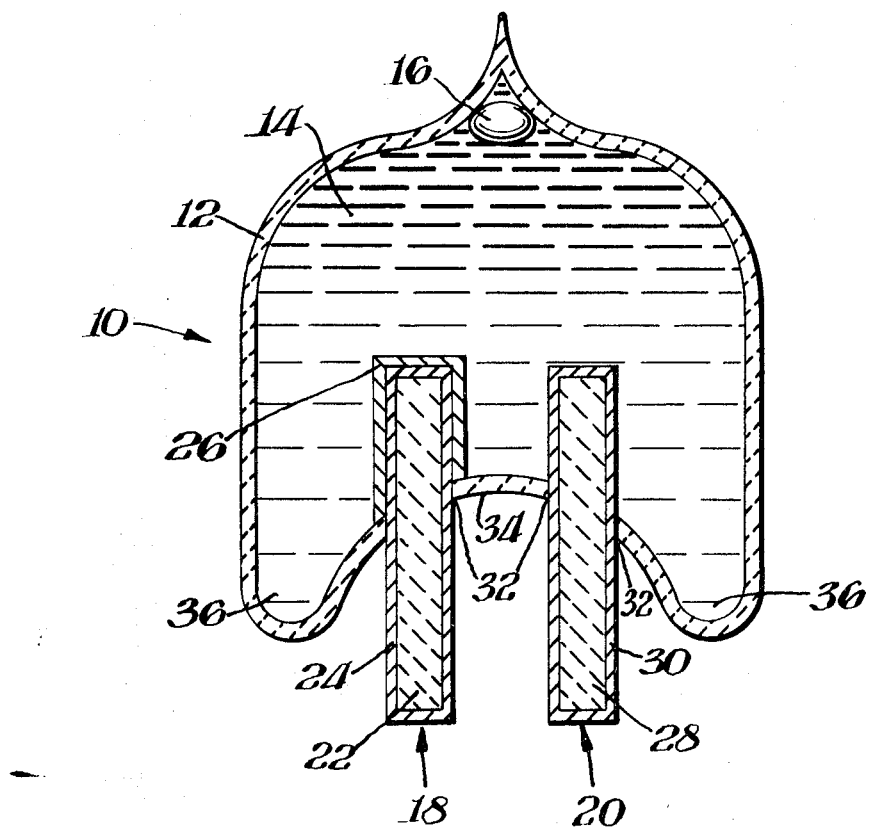

COULOMETRIC DEVICE WITH NONCONDUCTIVE INORGANIC ELECTRODE SUBSTRATE

This application is a continuation-in-part application of Ser. No. 792,648, filed Jan. 21, 1969, U.S. Pat. No. 3,564,347.

BACKGROUND OF THE INVENTION

The present invention relates to electrochemical devices and more particularly to a coulometric timing cell.

In the above-referred to patent application, one practical embodiment of a coulometric cell which has been used as a time measurement cell is described as consisting of two dissimilar metals separated by an electrolyte, with one of these metal electrodes being plated with a layer of the metal of the other electrode. When electrical current is passed through the cell in the appropriate direction, the plated layer will plate in the electrolyte, as a function of the amount of current flowing, until finally it is completely removed from the base electrode. At this time, the electrolytic cell will consist of two dissimilar electrodes and, in accordance with electrochemical principles, a voltage will appear across the two electrodes. This change, from essentially no voltage during the deplating, to the appearance of a voltage at the completion of deplating, can be used to signal the end of a time period, the duration of which reflects the number of coulombs passed, which in turn reflect the number of coulombs used to plate the coating.

In the manufacture of such cells it has been customary to use a system of gold versus silver, both being highly stable, precious and/or noble metals. Because of the cost of the gold, and sometimes the silver, these materials have been plated on a metal carrier or support, such as iron. Such systems have the defect that if any imperfection in the gold plating exists, and the underlying base support electrode becomes exposed to the electrolyte, destructive corrosion will occur, even in the absence of externally applied current.

Another disadvantage in the use of such an electrode is have in the fact that when a nonconductive, inorganic envelope is employed to house the cell, the electrodes must emerge from the cell directly through the wall of the nonconductive envelope. Because of the considerable difference in coefficient of thermal expansion between the various nonconductive materials e.g. glass, which may be employed as the enclosing structure, and the metal of the electrodes, changes in temperature can cause fracture of the envelope or leakage of the electrolyte from the system. In order to avoid this disadvantage the use of glass-to-metal seals hive been contemplated, however, the cost of these seals would make the units extremely uneconomical. A technique which would permit one to avoid the use of expensive glass-to-metal seals and still be confident of an effective seal about the periphery of the electrode members, would constitute a significant advance in this particular art.

An object of this invention is to present a stable coulometric cell which will withstand high vibration and shock over a wide environmental temperature range.

A further object is to present a reversible and/or rechargeable coulometric cell.

Yet another object is to present a coulometric cell not subject to contamination from base metals.

Still another object of this invention is to present an electrochemical timer of exceptional accuracy.

Additional objects will become apparent from the following description and claims.

SUMMARY OF THE INVENTION

The coulometric cell of the present invention comprises a nonconductive, inorganic envelope containing an electrolyte and an expansion bubble for preventing damage to said cell due to expansion of the electrolyte. First and second spaced electrode members extend from outside the envelope, through the wall thereof and into the electrolyte. Each electrode member comprises a nonconductive inorganic substrate having at least substantially the same coefficient of thermal expansion as that of the inorganic envelope. Each substrate carries a thin conductive film which extends from within to outside of the envelope. The envelope is bonded in fluidtight arrangement about the periphery of the electrode members at the point where they pass through the wall thereof.

The thin conductive film of the first electrode member is one selected from the group consisting of (1) an electrochemically deplatable metal; and (2) a conductive material having an electrochemically deplatable metal deposited thereon, said conductive material being more cathodic than said deplatable metal. The thin conductive film of the second electrode member is one selected from the group consisting of (a) the same deplatable metal employed on the first electrode member; and (b) a conductive material more cathodic than said deplatable metal.

In a preferred embodiment the electrochemically deplatable metal is one selected from the group consisting of zinc, cadmium, cobalt, silver, nickel, tin, copper, and lead. The conductive material more cathodic than the deplatable metal is preferably one selected from the group consisting of carbon, boron carbide, rhodium, palladium, platinum, and gold. It is to be understood, however, that for certain special arrangements certain combinations of deplatable metals can be employed as the individual electrodes as long as one is more cathodic than the other metal.

In the manufacture that the cell of the present invention it is necessary that there be an expansion bubble positioned inside of the cell so that during variations in temperature the bubble will cushion the expansion of the electrolyte and prevent the envelope of the cell from fracturing. The cushioning bubble must be kept out of contact with the electrodes when the cell is inverted, otherwise part of the deplating electrode will be taken out of the circuit and an inaccurate timing or reading will result. This can be accomplished by various internal structuring of the cell. For example, various bubble traps can be incorporated within the cell to prevent the bubble from contacting the deplatable electrode. One prior art bubble trap that may be employed is formed by causing the cell to be inwardly domed in the region of the electrodes. Thus, when the cell is inverted the bubble will tend to remain at the base of the slope of the dome and out of contact with the electrodes.

The electrolyte of the cell is preferred to be an electrolyte which will dissolve ions of the electrode which becomes the cathode of the cell in use without dissolving the metal of the electrode which becomes the anode in use.

BRIEF DESCRIPTION OF THE DRAWING

The FIGURE of the drawing is a side view in section of an electrochemical timer of the present invention.

In the drawing, an electrochemical timer 10 has a nonconductive inorganic envelope 12. The envelope contains an electrolyte 14 and an expansion bubble 16. Located part way within and part way outside of the cell are electrodes 18 and 20. Electrode 18 comprises a nonconductive inorganic substrate 22 which has the same coefficient of thermal expansion of the material of envelope 12. Plated on substrate 22 is thin metal film 24. Deposited over all of that portion of film 24 extending within the cell is metal 26. Electrode member 20 comprises nonconductive substrate 28 also having a coefficient of thermal expansion the same as that of envelope 12. Deposited on this substrate is a thin metal film 30. A fluidtight bond is formed between the envelope 12 and the periphery of electrode members 18 and 20 as at region 32. Inwardly domed region 34, provides bubble-trap regions 36 within the cell.

The drawing is intended to be representative of one of four possible electrode combinations. The four possible combinations are as follows:

1. The first electrode comprises a nonconductive inorganic substrate, a thin conductive film coating the same and a deposit of an electrochemically deplatable metal thereon, wherein the conductive film is more cathodic than said deplatable metal; the second electrode comprises a nonconductive inorganic substrate and a thin conductive film thereon which is more cathodic than said deplatable metal.
2. The first electrode is the same as the first electrode of (1) and the second electrode comprises a nonconductive, inorganic substrate having an electrochemically deplatable metal deposited thereon.
3. The first and second electrodes are identical, comprising nonconductive, inorganic substrates having an electrochemically deplatable metal deposited on each.
4. The first electrode comprises a nonconductive, inorganic substrate having an electrochemically deplatable metal deposited thereon and the second electrode is a nonconductive, inorganic substrate having a thin conductive film, more cathodic than said deplatable metal, deposited thereon.

The terminology "more cathodic than said deplatable metal" is defined as follows: The Electromotive Force Series of Elements (see e.g. Handbook of Chemistry and Physics, Chemical Rubber Pub. Co., Cleveland, Ohio 37th Edition, page 1,660) consists of a listing of half-cell reactions or couples in an order according to the relative ease of oxidation. Thus, when pairs of these couples are compared, one member is found to be less easily oxidized or more cathodic than the other. In this manner the anode collector should be more cathodic than the deplatable metal.

DETAILED DESCRIPTION OF THE INVENTION

EXAMPLE I

The nonconductive inorganic envelope of a cell in accordance with this invention was prepared from a Pyrex tube having a ½-inch inside diameter, a wall thickness of about one thirty-second inch and one closed, rounded end. In the rounded end two spaced holes are formed to accommodate the electrodes of the cell. Two Pyrex glass rods 1/16-inch diameter and 1 inch long were coated with a platinum film approximately 100 microinches thick. The coated rods were inserted in the spaced holes so that about one-third of the rods extended within the tube. Using a specially designed, heated mold, the Pyrex about said holes, was fused to the platinum and at the same time the end of the tube was concaved to yield a configuration similar to that of the drawing. The electrical continuity of each electrode remained intact during the fusion step. The open end of the envelope was then reduced in size to about 1/16-inch inside diameter.

One electrode was plated with the equivalent of 500-microampere hours of silver by filling the cell with a standard silver-plating bath of the following composition: AgCN 50 9./1. KCN 100 g./1. $K_2CO_3$ 35 g./1. and $KNO_3$ 100 g./1. During plating only the cathode received silver and the anode remained intact. The cell was then rinsed clean. A working electrolyte of 60-weight percent phosphoric acid containing 0.9 N $Ag^+$, obtained from $Ag_3PO_4$, was placed in the cell and the tip of the cell was heat sealed closed. A small expansion bubble was provided in the cell.

The unit was heat cycled from 20° C. to 90° C. several times and no fracturing or leaking at the platinum Pyrex interfaces was observed. The unit was tested and at the end of 500-microampere hours of discharge, a significant increase in voltage signalled the complete deplating of the silver anode.

Suitable materials for the nonconductive inorganic envelope and for the substrates for the electrodes are glass, ceramic materials such as porcelain, aluminum, quartz, etc.

It is to be understood that that portion of the envelope carrying the electrodes of the cell can be manufactured as a separate stem arrangement much in the manner that the stems of vacuum tubes are manufactured. With this type of an arrangement, the central portion of the stem can be stepped upward so that the peripheral portion of the stem is lower than the central portion. This lowered portion can provide the bubble trap for the cell in the event that the cell is in an inverted position in use. The stem can be fused to the remainder of the envelope by conventional glass-fusing techniques. The various metals employed herein can be deposited on the nonconductive, inorganic substrates by well-known prior art techniques, such as plating, sputtering, evaporating, or any other technique of depositing a thin layer of metal upon a nonconductive substrate.

The selection of a working electrolyte system will be dependent upon the metals employed in the coulometric cell. These electrolytes may be acidic, alkaline or neutral in nature, depending upon the system, but they must have a tolerance for the ions of the deplatable metal. For example, phosphoric acid electrolytes are suitable for silver plated anodes on a gold substrate. The electrolyte may be gelled by means of an organic or inorganic additive, although caution must be exercised to assure ion mobility.

Since it is obvious that many changes and modifications can be made in the above described details without departing from the nature and spirit of the invention it is to be understood that the invention is not limited to said details except as set forth in the appended claims.

What is claimed is:

1. A coulometric cell comprising a nonconductive inorganic envelope containing an electrolyte and an expansion bubble for preventing damage to said cell due to expansion of the electrolyte; first and second spaced electrode members extending from outside said envelope, through the wall thereof and into said electrolyte; each electrode member comprising a nonconductive inorganic substrate having at least substantially the same coefficient of thermal expansion as that of said inorganic envelope, each substrate carrying a thin conductive film which extends from within to outside of said envelope, said envelope being bonded in fluidtight arrangement to and about the periphery of said electrode members where the pass through the wall thereof; the thin conductive film of said first electrode member being selected from the group consisting of:
   1. an electrochemically deplatable metal; and
   2. a conductive material having an electrochemically deplatable metal deposited thereon, said conductive material being more cathodic than said deplatable metal; the thin conductive film of said second electrode member being selected from the group consisting of:
      a. the same deplatable metal employed on said first electrode member;
      b. a conductive material more cathodic than said deplatable metal.

2. The cell of claim 1 wherein said nonconductive, inorganic envelope and substrates are of a member selected from the group consisting of a glass and ceramic.

3. The cell of claim 2 wherein said electrochemically deplatable metal is selected from the group consisting of zinc, cadmium, cobalt, silver, nickel, tin, copper and lead, and said conductive material more cathodic than said deplatable metal is one selected from the group consisting of carbon, boron carbide, rhodium, palladium, platinum and gold.

4. The cell of claim 3 wherein said cell has expansion bubble trapping means to keep said bubble out of contact with said electrodes.

5. The cell of claim 3 wherein said thin conductive film of said first and second electrodes are both silver.

6. The cell of claim 3 wherein the thin conductive film of said first electrode member is silver and of said second electrode is a member of the group consisting of gold and platinum.